US012137830B2

(12) United States Patent
Greening

(10) Patent No.: US 12,137,830 B2
(45) Date of Patent: Nov. 12, 2024

(54) MOUNTING BRACKET

(71) Applicant: Louver-Lite Limited, Cheshire (GB)

(72) Inventor: Andrew Greening, Cheshire (GB)

(73) Assignee: Louver-Lite Limited, Hyde (GB)

( * ) Notice: Subject to any disclaimer, the term of this patent is extended or adjusted under 35 U.S.C. 154(b) by 96 days.

(21) Appl. No.: 17/918,508

(22) PCT Filed: Apr. 16, 2021

(86) PCT No.: PCT/EP2021/060000
§ 371 (c)(1),
(2) Date: Oct. 12, 2022

(87) PCT Pub. No.: WO2021/209635
PCT Pub. Date: Oct. 21, 2021

(65) Prior Publication Data

US 2023/0142806 A1 May 11, 2023

(30) Foreign Application Priority Data

Apr. 17, 2020 (GB) ...................................... 2005640

(51) Int. Cl.
*A47H 1/13* (2006.01)
*E06B 9/32* (2006.01)

(52) U.S. Cl.
CPC ................. *A47H 1/13* (2013.01); *E06B 9/32* (2013.01)

(58) Field of Classification Search
CPC ........... A47H 1/13; E06B 9/323; E06B 9/266; E06B 9/32; B60P 7/15

(Continued)

(56) References Cited

U.S. PATENT DOCUMENTS 6,851,652 B1 * 2/2005 Huang .................... E04G 25/08 248/200.1
7,549,615 B2 * 6/2009 Shevick .................. E06B 9/323 248/200.1

(Continued)

FOREIGN PATENT DOCUMENTS

DE 102017112247 12/2018
JP 2001207754 8/2001
JP 2007107302 4/2007

OTHER PUBLICATIONS

International Search Report and Written Opinion issued on Aug. 17, 2021 in International Patent Application No. PCT/EP2021060000.

*Primary Examiner* — Ingrid M Weinhold
(74) *Attorney, Agent, or Firm* — Billion & Armitage

(57) ABSTRACT

A Mounting Bracket A mounting bracket for a window blind including a resiliently deformable friction element, and a hinge assembly, wherein the hinge assembly includes a hinge lever member hingedly coupled to a hinge plate, wherein the hinge lever member has a first configuration in which it lies adjacent to the hinge plate, and a second configuration in which it is angled away from the hinge plate; the resiliently deformable friction element is slidably coupled to the hinge plate and extends from one end thereof; and the hinge lever member exerts a cam action on the resiliently deformable friction element, wherein the resiliently deformable friction element is urged away from the hinge plate as the hinge lever member rotates from its first configuration to its second configuration.

15 Claims, 1 Drawing Sheet

(58) Field of Classification Search
USPC ..... 248/200.1, 200, 254, 257–260, 267–272, 248/208
See application file for complete search history.

(56) References Cited

U.S. PATENT DOCUMENTS

| | | | | |
|---|---|---|---|---|
| 9,670,722 | B1 | 6/2017 | Hall et al. | |
| 10,538,962 | B2 * | 1/2020 | Hall | E06B 9/323 |
| 10,934,771 | B2 * | 3/2021 | Bohlen | E06B 9/323 |
| 11,802,441 | B2 * | 10/2023 | Vangberg-Brinkmann | E06B 9/50 |
| 2008/0078508 | A1 * | 4/2008 | Guisti | E06B 9/323 160/166.1 |
| 2009/0242143 | A1 * | 10/2009 | Pham | E06B 9/40 160/133 |
| 2014/0084122 | A1 * | 3/2014 | Shevick | E06B 9/50 248/268 |
| 2014/0086676 | A1 * | 3/2014 | Coker | E06B 9/323 403/326 |

* cited by examiner

MOUNTING BRACKET

FIELD OF THE INVENTION

The present invention relates to a mounting bracket and, in particular, to a mounting bracket for a window blind.

BACKGROUND OF THE INVENTION

Mounting brackets for window blinds are typically fixed to a substrate, such as a ceiling, a wall or planar surfaces within a window recess. Such fixing of the brackets necessarily damages the substrate to which they are fixed, which may be undesirable in certain circumstances. Additionally, the window blinds may only be required on a temporary basis Accordingly, there is a need for window brackets that do not require to be secured to a substrate via fixings that penetrate or otherwise damage the substrate.

SUMMARY OF THE INVENTION

According to a first aspect of the invention, there is provided a mounting bracket for a window blind including a resiliently deformable friction element, and a hinge assembly, wherein the hinge assembly includes a hinge lever member hingedly coupled to a hinge plate, wherein the hinge lever member has a first configuration in which it lies adjacent to the hinge plate, and a second configuration in which it is angled away from the hinge plate; the resiliently deformable friction element is slidably coupled to the hinge plate and extends from one end thereof; and the hinge lever member exerts a cam action on the resiliently deformable friction element, wherein the resiliently deformable friction element is urged away from the hinge plate as the hinge lever member rotates from its first configuration to its second configuration.

The bracket according to the invention form a friction fit against the substrate to which they are secured. The bracket is located such that the resiliently deformable friction element contacts the substrate when the hinge lever member is in its first configuration and the bracket is fixed against movement away from the substrate. As the hinge lever member is moved from its first configuration to its second configuration, the cam action of the hinge lever member against the resiliently deformable friction element urges the friction element against the substrate, which in turn deforms the resiliently deformable friction element and generates a frictional force between the resiliently deformable friction element and the substrate. The frictional force generated in this way is sufficient to support a window blind carried by the bracket without the need for additional fixings.

When the hinge lever member is moved from its second configuration to its first configuration, the cam action is removed and the frictional force between the friction element and the substrate is reduced such that the bracket can be removed from the substrate with little or no damage to the substrate.

In an embodiment of the invention, the mounting bracket further includes a hinge pin about which the hinge lever member rotates. Thus, the hinge pin may be located between the hinge plate and the hinge lever member. In such embodiments, both the hinge plate and the hinge lever member may include hinge pin receiving portions which are adapted to receive and retain therein the hinge pin. Such hinges are well understood and relatively easy to construct.

In use, the hinge lever member suitably depends downwards from the hinge plate. Accordingly, in embodiments in which the hinge plate is fixed relative to a substrate (e.g. located substantially horizontally), the hinge lever member may subtend an angle of from 80° to 100° with respect to the hinge plate when in its second configuration. In other words, when the hinge plate is located substantially horizontally, the hinge lever member may depend vertically ±10°.

Suitably, the angle subtended between the hinge plate and the hinge lever member when the hinge lever member is in its second configuration is about 90°.

In a further embodiment of the invention, wherein the hinge lever member includes a proximal end located adjacent to the hinge and the hinge lever member defines a cam portion at the proximal end, wherein the cam portion of the hinge lever member contacts the resiliently deformable friction element. In other words, the proximal portion of the hinge lever member is cam-shaped and this portion of the hinge lever member engages the resiliently deformable friction element. As the distal portion of the hinge lever member is rotated, cam defined at the proximal end exerts a force on the resiliently deformable friction element which urges the resiliently deformable friction element away from the hinge plate. Such an arrangement maximises the leverage of the distal end of the hinge lever member.

Thus, the resiliently deformable friction element may be slidably coupled to the hinge plate and the proximal portion of the hinge lever member may be located between the resiliently deformable friction element and the hinge plate. In such an embodiment, the hinge lever member may define or control the spacing between the resiliently deformable friction element and the hinge plate.

In a further embodiment of the invention, the resiliently deformable friction element includes a substantially planar contact surface which defines a length dimension and a width dimension, and the resiliently deformable friction element is compressible in a thickness direction. In other words, the resiliently deformable friction element may be compressible in a direction normal to the plane defined by the contact surface.

The resiliently deformable friction element may include a layer of a resiliently deformable polymeric material. In such embodiments, it is the polymeric layer of the friction element that is resiliently deformable. In certain embodiments, the polymeric layer is discontinuous or it may contain a discontinuous portion. Thus, the layer may be a continuous layer or it may include discrete portions of the polymer, which together may define the substantially planar contact surface. When the polymeric layer is discontinuous, it may include a plurality of polymeric blocks, for example, an array of separate polymeric blocks. In such embodiments, the blocks may be spaced from each other and may have the same or different length and width dimensions. However, the height dimension of each block is suitably the same, such that the blocks define a substantially planar contact surface.

The polymeric material may inherently provide a relatively high friction surface and compression of the resiliently deformable polymeric material increases the available frictional forces. Moreover, the use of a discontinuous contact surface permits the polymeric material to deform laterally as well as axially, where "axially" is defined as the axis along which the compression force is applied.

The polymeric layer may comprise a substantially continuous portion and a discontinuous portion located outwardly of the continuous portion.

In an embodiment of the invention, the resiliently deformable friction element includes at least one arm which is slidably coupled to the hinge plate. For example, the hinge plate may define at least one channel and the or each arm of the resiliently deformable friction element may be slidably carried within a respective channel. In embodiments in which the hinge lever member is located between the hinge plate and the friction element, the arms may pass through, above or to the side of the hinge lever member. In this way, the friction element may slide relative to the hinge plate even with the hinge lever member located between the hinge plate and the friction element.

In a further embodiment of the invention, the mounting bracket further includes a mounting plate and the hinge plate is coupled to the mounting plate. For example, the mounting plate may be used to couple the hinge plate to a headrail or other elongate spacing member which defines the spacing between opposed mounting brackets. In such embodiments, a hinge arrangement carried by or defined by the hinge plate extends beyond the mounting plate.

In cases in which a pair of opposed mounting brackets are to be used and the opposed brackets are spaced apart by an elongate spacing member, the tolerances in relation to the various components may be such that a non-optimum frictional force is generated. Accordingly, the mounting plate may include an adjustment block and a distal end of the hinge plate may engage a contact surface of the adjustment block. In the context of the present invention, the end of the hinge plate adjacent to the hinge is considered to be the proximal end of the hinge plate and the distal end of the hinge plate is the end that is opposite to the proximal end or opposite to the hinge. In this way, the adjustment block may allow for relatively small adjustments to the spacing between opposed mounting brackets. These relatively small adjustments can allow for manufacturing tolerances and for small errors in measurement by a blind fitter.

In an embodiment of the invention, the adjustment block is carried by the mounting plate in one of a plurality of different configurations, wherein each configuration defines a spacing between the contact surface of the adjustment block and a proximal end of the mounting plate and each defined spacing is different. Again, in the context of the present invention, the term "proximal" refers to the end of the component that is closest to the hinge arrangement. Accordingly, on the basis that the mounting plate is fixed, the spacing between the contact surface of the adjustment block and the proximal end of the mounting plate may be varied and the distal end of the hinge plate engages the contact surface of the adjustment block, the distance by which the hinge arrangement of the hinge plate extends from the proximal end of the mounting plate is variable.

In a further embodiment of the invention, the adjustment block defines three or more contact sides and is carried by a corresponding aperture in the mounting plate, wherein each configuration corresponds to a rotational orientation of the block within the aperture. Thus, where the adjustment block includes three contact sides, it is suitably triangular in shape. In such embodiments, the corresponding aperture in the mounting plate is a correspondingly shaped aperture and is also triangular. Similarly, a four-sided adjustment block will be carried by a four-sided aperture, a five-sided adjustment block will be carried by a five-sided aperture, and so on.

In an embodiment of the invention, the adjustment block is square, the aperture within the mounting plate is square, the adjustment block defines four contact sides and the adjustment block is located within the aperture in the desired orientation.

In embodiments in which the adjustment block is carried within a correspondingly shaped aperture defined by the mounting plate, the adjustment block is suitably releasably coupled to the mounting plate, for example via a friction fit or a snap-fit arrangement.

Although the mounting brackets described above are suitable for use as window blind mounting brackets, they may be used in alternative systems, such as shower curtains, for example. Thus, the mounting brackets of the first aspect of the invention may be suitable for use as shower curtain mounting brackets.

According to a second aspect of the invention, there is provided a window blind mounting system including a pair of opposed mounting brackets as defined anywhere hereinabove in connection with the first aspect of the invention and an elongate spacing member located between the mounting brackets. As noted above, the elongate spacing member maintains the spacing between the mounting brackets in use.

The elongate spacing member may be a component whose sole function is as a spacing member. Alternatively, it may be a component that has one or more additional functions, such as a headrail for window blind or a housing for a window blind (often referred to as a "cassette" unit).

In an embodiment of the invention according to the second aspect of the invention, each mounting bracket is coupled to a respective end of the elongate spacing member via a mounting plate. The mounting plates may be as described above in connection with the first aspect of the invention. Thus, the mounting plate may include an adjustment block, for example.

According to a third aspect of the invention, there is provided a shower curtain mounting system including a pair of opposed mounting brackets as defined anywhere hereinabove in connection with the first aspect of the invention and an elongate spacing member located between the mounting brackets. As noted above, the elongate spacing member maintains the spacing between the mounting brackets in use.

The elongate spacing member may be a shower curtain rail from which a shower curtain or parts of a multi-part shower curtain may be suspended. Alternatively, it may be a component which is separate to the shower curtain rail.

In an embodiment of the invention according to the third aspect of the invention, each mounting bracket is coupled to a respective end of the elongate spacing member via a mounting plate. The mounting plates may be as described above in connection with the first aspect of the invention. Thus, the mounting plate may include an adjustment block, for example.

According to a fourth aspect of the invention, there is provided a window blind including a pair of opposed mounting brackets as defined anywhere herein in connection with the first aspect of the invention, a blind substrate and a blind substrate carrier, wherein the blind substrate carrier is located between the opposed mounting brackets.

In an embodiment of the invention according to the fourth aspect, the blind substrate comprises a sheet of fabric and the blind substrate carrier is a roller tube. In such embodiments, the roller tube may be rotatably coupled to the hinge lever members of the mounting brackets when they are in their second configurations.

Roller blinds according to the fourth aspect may require a further component to receive the hinge plates of the mounting brackets. Accordingly, in embodiments in which the blind substrate comprises a sheet of fabric and the blind substrate carrier is a roller tube, the window blind may further include an elongate spacing member located between the opposed mounting brackets and each mounting bracket may be coupled to a respective end of the elongate spacing member. For example, the hinge plate of each mounting bracket may be coupled to a respective end of the elongate spacing member either directly or via a mounting plate as described hereinabove.

As an alternative to roller blinds, the window blinds of the fourth aspect of the invention may comprise a plurality of separate blind elements, such as vanes or louvres. These may be carried by a headrail and may be arranged substantially horizontally (a Venetian blind) or substantially vertically (a vertical blind). Thus, in an embodiment of the invention according to the fourth aspect, the blind substrate comprises a plurality of separate blind elements and the blind substrate carrier is a headrail to which the blind elements are coupled. In such embodiments, each mounting bracket may be coupled to a respective end of the headrail. Thus, the headrail may function as an elongate spacing element. The hinge plates of each mounting bracket may be coupled to a respective end of the headrail, either directly or via a mounting plate as described hereinabove.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which:

For the avoidance of doubt, the skilled person will appreciate that in this specification, the terms “up”, “down”, “front”, “rear”, “upper”, “lower”, “width”, etc. refer to the orientation of the components as found in the example when installed for normal use as shown in the Figures.

DETAILED DESCRIPTION OF THE INVENTION

Figure 1:
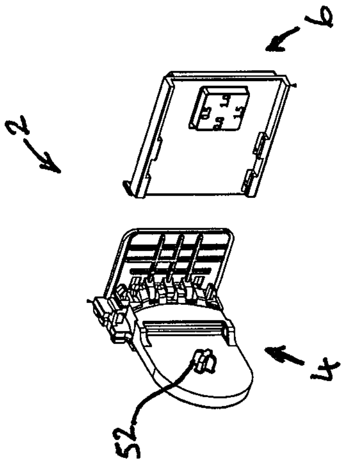
FIG. 1 shows a partially exploded perspective view of a mounting bracket according to the invention.

FIG. 1 shows a partially exploded view of a mounting bracket 2 which comprises a hinge assembly 4 and a mounting plate 6.

Figure 2:
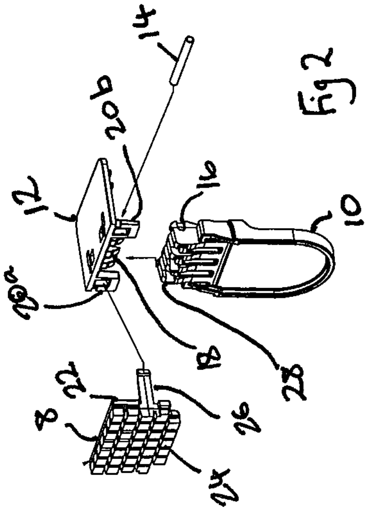
FIG. 2 shows an exploded perspective view of a hinge assembly which forms part of the mounting bracket shown in FIG. 1.

The hinge assembly is shown in more detail in FIG. 2 and comprises a resiliently deformable friction element 8, a hinge lever member 10, a hinge plate 12 and a hinge pin 14.

The hinge lever member 10 includes a first set of hinge pin receiving elements 16 and the hinge plate 12 includes a second set of hinge pin receiving elements 18. Together, the first and second sets of hinge pin receiving elements 16, 18 define a hinge pin channel which receives therein the hinge pin 14. With the hinge pin 14 located within the channel defined by the first and second hinge pin receiving elements 16, 18, the hinge lever member 10 is hingedly coupled to the hinge plate 12.

The hinge plate 12 further includes a pair of wall elements 20*a*, 20*b* which each define a respective channel.

The resiliently deformable friction element 8 includes a planar base plate 22 from which extend transversely an array of polymeric blocks 24 which are resiliently deformable. The planar base plate 22 also includes a pair of projecting arms 26 (only one of which is seen in FIG. 2), which project in the opposite direction to the polymeric blocks 24. Each of the projecting arms 26 is received within a respective channel defined by the hinge plate wall elements 20*a*, 20*b*, such that the friction element 8 is slidably coupled relative to the hinge plate 12.

The first set of hinge pin receiving elements 16 further define a cam surface 28 which is spaced from the hinge pin 14. The cam surface 28 contacts a rear surface (i.e. the surface opposite to the surface from which the polymeric block 24 project) of the planar base plate 22.

Figure 3:
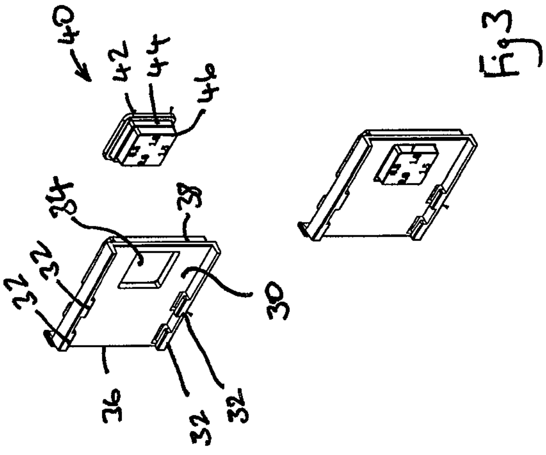
FIG. 3 shows an exploded view of a mounting plate which forms part of the mounting bracket shown in FIG. 1.

FIG. 3 shows the mounting plate 6 in more detail. The mounting plate 6 includes a main body element 30 which includes an array of locating lugs 32 and defines a square aperture 34. The main body element 30 defines a leading edge 36 and a trailing edge 38.

The mounting plate 6 further includes an adjustment block 40. The adjustment block 40 comprises a base plate 42 from which extends a square intermediate portion 44 which is inwardly spaced from the periphery of the base plate 42. From the intermediate portion 44 extends a contact portion 46.

The intermediate portion 44 is sized to form a friction fit within the aperture 34 when the base plate 42 is arranged adjacent to the rear surface of the main body element 30. The skilled person will appreciate that as the aperture 34 is square and the intermediate portion 44 is square, the intermediate portion 44 may be located in the aperture in one of four possible orientations. Each of the four side walls of the contact portion 46 is spaced from a corresponding wall of the intermediate portion 44 by a different distance. This means that in a first orientation of the intermediate portion 44 in the aperture 34, a first gap is defined between the leading edge 36 of the main body element 30 and the wall of the contact portion 46 which faces the leading edge 36; in a second orientation of the intermediate portion 44 in the aperture 34, a second gap is defined between the leading edge 36 of the main body element 30 and the wall of the contact portion 46 which faces the leading edge 36; in a third orientation of the intermediate portion 44 in the aperture 34, a third gap is defined between the leading edge 36 of the main body element 30 and the wall of the contact portion 46 which faces the leading edge 36; and in a fourth orientation of the intermediate portion 44 in the aperture 34, a fourth gap is defined between the leading edge 36 of the main body element 30 and the wall of the contact portion 46 which faces the leading edge 36. Each of the first, second, third and fourth gaps are different.

Figure 4A:
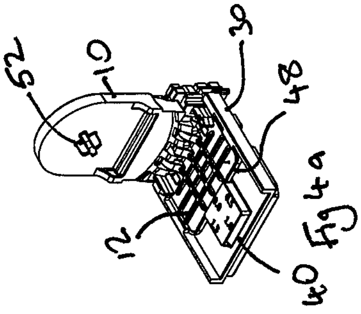
FIGS. 4*a* and 4*b* show perspective views of the mounting bracket shown in FIG. 1 in its assembled configuration.

As shown in FIG. 4*a*, the hinge plate 12 is located adjacent to a front face of the main body element 30 and slidably retained by the locating lugs 32, such that the hinge plate 12 can slide relative to the main body element 30. A distal end 48 of the hinge plate 12 contacts one wall of the contact portion 46 of the adjustment block 40. The skilled person will appreciate that the distance by which proximal end of the hinge plate extends from the leading edge 36 of the main body element 30 may be adjusted by varying the orientation of the adjustment block 40 within the aperture 34. This allows for tolerances to be taken up without losing any of the available frictional force that may be exerted by the friction element 8 on a substrate.

Figure 4B:
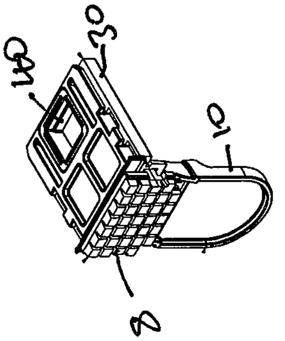

FIG. 4*b* shows the opposite side of the mounting bracket 2 in its assembled configuration.

Figure 5A:
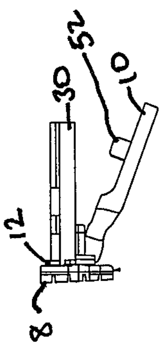
FIG. 5*a* shows a side elevational view of the mounting bracket shown in FIG. 1 in its first configuration.

FIG. 5*a* shows the mounting bracket 2 with the hinge assembly 4 in its first (closed) configuration in which the hinge lever member 10 is rotated until it lies substantially adjacent to the hinge plate 12. In this configuration, the cam surface 28 permits the base plate 22 of the friction element 8 to contact the proximal end of the hinge plate 12.

Figure 5B:
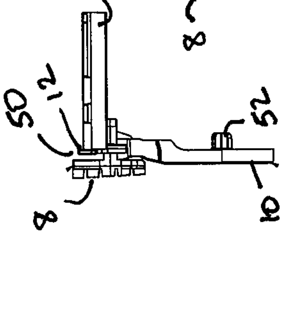
FIG. 5*b* shows a side elevational view of the mounting bracket shown in FIG. 1 in its second configuration.

In contrast, FIG. 5*b* shows the mounting bracket 2 with the hinge assembly 4 in its second (open) configuration in which the hinge lever member 10 is rotated such that it subtends an angle of substantially 90° with the hinge plate 12. In this configuration, the cam surface 28 urges the friction element 8 away from the hinge plate 12 such that a gap 50 is defined between the base plate 22 of the friction element 8 and the proximal end of the hinge plate 12.

In use, one mounting plate 6 with the adjustment block 40 in a first orientation is coupled to each end of a blind headrail (not shown). A hinge assembly 4 in its first (closed) configuration is then slidably coupled to the main body element 30 of each of the two mounting plates 6.

The headrail/mounting bracket assembly is then located between a pair of substrates which define between them a window or other architectural opening and the hinge assemblies are then moved to the their second (open) configurations. This forces the friction elements 8 outwards such that the resiliently deformable blocks 24 contact the substrates and are deformed. The deformation of the blocks 24 generates a frictional force between the friction element 8 and the respective substrate.

The amount of deformation/frictional force exerted may be adjusted, if desired, by rotating the adjustment blocks 40 to different orientations within the apertures 34. This allows for the correction of any tolerances in the length of the headrail or measurement of the spacing between the opposed substrates.

When the desired frictional forces are obtained between the friction elements 8 and their respective substrates, a blind roller tube may be coupled to respective coupling lugs 52 defined by the hinge lever members 10. The roller tube maintains the hinge lever arms 10 in their second (open) configurations and thereby maintains the frictional force between the mounting brackets 2 and their respective substrates such that no further fixings are needed to secure the window blind in the desired location.

The invention claimed is:

1. A window blind mounting system including a pair of opposed mounting brackets, wherein each mounting bracket includes a resiliently deformable friction element, and a hinge assembly, wherein the hinge assembly includes a hinge lever member hingedly coupled to a hinge plate, wherein the hinge lever member has a first configuration in which it lies adjacent to the hinge plate, and a second configuration in which it is angled away from the hinge plate; the resiliently deformable friction element is slidably coupled to the hinge plate and extends from one end thereof; and the hinge lever member exerts a cam action on the resiliently deformable friction element, wherein the resiliently deformable friction element is urged away from the hinge plate as the hinge lever member rotates from its first configuration to its second configuration; wherein each hinge plate is received within a respective mounting plate, and the mounting plates are configured to mount to respective opposing ends of an elongate spacing member to define a spacing between the opposed mounting brackets, wherein each hinge lever member is configured to couple to opposite ends of a blind roller tube, respectively.

2. The window blind mounting system according to claim 1, wherein each mounting bracket further includes a hinge pin about which the hinge lever member rotates.

3. The window blind mounting system according to claim 1, wherein the hinge lever member subtends an angle of from 80° to 100° with respect to the hinge plate when in its second configuration.

4. The window blind mounting system according to claim 3, wherein the hinge lever member subtends an angle of 90° with respect to the hinge plate when in its second configuration.

5. The window blind mounting system according to claim 1, wherein the hinge lever member includes a proximal end located adjacent to the hinge plate and the hinge lever member defines a cam portion at the proximal end, wherein the cam portion of the hinge lever member contacts the resiliently deformable friction element.

6. The window blind mounting system according to claim 1, wherein the resiliently deformable friction element includes a substantially planar contact surface which defines a length dimension and a width dimension, and the resiliently deformable friction element is compressible in a thickness direction.

7. The window blind mounting system according to claim 1, wherein the resiliently deformable friction element includes a layer of a polymeric material.

8. The window blind mounting system according to claim 7, wherein the layer of the polymeric material is discontinuous and comprises an array of separate polymeric blocks.

9. The window blind mounting system according to claim 1, wherein the resiliently deformable friction element includes at least one arm which is slidably coupled to the hinge plate.

10. The window blind mounting system according to claim 9, wherein the hinge plate defines at least one channel and the at least one arm of the resiliently deformable friction element is slidably carried within a respective one of the at least one channel.

11. The window blind mounting system according to claim 1, wherein each mounting bracket further includes a mounting plate and the hinge plate is coupled to the mounting plate.

12. The window blind mounting system according to claim 11, wherein the mounting plate includes an adjustment block and a distal end of the hinge plate engages a contact surface of the adjustment block.

13. The window blind mounting system according to claim 12, wherein the adjustment block is carried by the mounting plate in one of a plurality of different configurations, wherein each configuration defines a spacing between the contact surface of the adjustment block and a proximal end of the mounting plate, and each defined spacing is different.

14. The window blind mounting system according to claim 13, wherein the adjustment block is square, the aperture within the mounting plate is square, the adjustment block defines four contact sides and the adjustment block is located within the aperture in the desired orientation via a friction fit or a snap fit.

15. A window blind mounting system including a pair of opposed mounting brackets for mounting a blind substrate carrier, wherein each mounting bracket includes a resiliently deformable friction element, and a hinge assembly, wherein the hinge assembly includes a hinge lever member hingedly coupled to a hinge plate, wherein the hinge lever member has a first configuration in which it lies adjacent to the hinge plate, and a second configuration in which it is angled away from the hinge plate; the resiliently deformable friction element is slidably coupled to the hinge plate and extends from one end thereof; and the hinge lever member exerts a cam action on the resiliently deformable friction element, wherein the resiliently deformable friction element is urged away from the hinge plate as the hinge lever member rotates from its first configuration to its second configuration, wherein each hinge lever member is configured to couple to opposite ends of the substrate carrier, respectively.

* * * * *